Patented May 2, 1950

2,505,824

UNITED STATES PATENT OFFICE 2,505,824

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application March 12, 1947, Serial No. 734,206

6 Claims. (Cl. 252—342)

This invention relates to new chemical products or compounds and to the use and manufacture of same.

One object of our invention is to provide new chemical products or compounds that are particularly adapted for use as a demulsifier in petroleum emulsions, and which are also capable of various other uses as hereinafter described.

Another object of our invention is to provide a practical method of making the said compounds or chemical products.

Another object of our invention is to provide a novel process for resolving petroleum emulsions of the water-in-oil type that are commonly referred to as "cut oil," "emulsified oil," "roily oil," etc., and which comprise fine droplets of naturally-occurring waters or brines dispersed in a more or less permanent state throughout the oil which constitutes the continuous phase of the emulsion.

And still another object of our invention is to provide an economical and rapid process for separating emulsions which have been prepared under controlled conditions from mineral oil, such as crude oil and relatively soft waters or weak brines. Controlled emulsification and subsequent demulsification under the conditions just mentioned, are of significant value in removing impurities, particularly inorganic salts from pipeline oil.

Demulsification as contemplated in the present application, includes the preventive step of commingling the demulsifier with the aqueous component which would or might subsequently become either phase of the emulsion in absence of such precautionary measure. Similarly, such demulsifier may be mixed with the hydrocarbon component.

Briefly stated, the new chemical compounds herein contemplated and particularly for use as demulsifying agents, are obtained by the reaction of certain polyethylene glycols with certain acidic fractional esters of triricinolein. Such acidic esters are obtained by reacting triricinolein with one to three moles of polycarboxy acid and particularly a dicarboxy acid such as phthalic acid, adipic acid, diglycolic acid, etc., with the proviso that such acid be free from alpha-beta unsaturation, thus eliminating dicarboxy acids having active dienophylic components or structures such as maleic anhydride, citraconic anhydride, etc.

The hereto appended claims are limited to derivatives of dicarboxy acid or anhydrides.

Acidic esters of triricinolein can be manufactured in two different ways, although using the same general procedure. One method is to use temperatures not in excess of 210° and in absence of any catalyst. Under such circumstances one forms the expected esters in which the dicarboxy acid radical is invariably attached to the ricinoleyl hydroxyl. The second procedure involves the use of temperatures higher than 210° C. in the presence or absence of catalysts so that a certain amount of rearrangement may take place, with the result that the dicarboxy acid radical may be attached to the glyceryl radical and not limited to attachment to the ricinoleyl radical. This latter type of structure will be clarified by subsequent description. It is to be noted, however, that the compounds contemplated herein are those obtained from intermediates in which the dicarboxy acid radical is attached to the ricinoleyl radical and thus excludes acidic esters obtained by rearrangement at higher temperatures or in presence of catalysts.

The manufacture of fractional esters of triricinolein is well known and described in numerous patents. The literature, including various patents, also describes the esterification of such fractional esters with polyhydric alcohols, including polyglycols under various conditions involving, for example, either the presence or absence of catalysts or a variety of catalysts, including both acid and basic catalysts.

Attention is directed to our co-pending application, Serial No. 666,819, filed May 2, 1946, now abandoned. Said co-pending application is concerned with the oxyalkylation, particularly the oxyethylation, of the same acidic fractional esters as herein employed for reaction with nonaethyleneglycol or the like. In our said aforementioned co-pending application, Serial No. 666,819, we stated as follows: "It has been suggested that the reaction of a fractional ester with a polyethylene glycol under various conditions would, in essence, result in a product substantially the same as that obtained by reacting with ethylene oxide so as to obtain the same stoichiometric relationship. We have found that this is not the case and that the resultant products are significantly different in composition, and those products obtained by oxyethylation are much more effective for a number of purposes, such as, for example, demulsification of petroleum emulsions, break inducer in doctor treatment of sour hydrocarbons, etc." Although we have found the products obtained by oxyalkylation of these particular esters to be particularly desirable and in many cases superior to those obtained by reaction with nonaethyleneglycol or the like, yet in a number of instances the resultant obtained from the reaction involving a polyglycol instead of an alkylene oxide, is still of outstanding merit for various processes, such as demulsification, break induction, etc.

In order to specify the nature of the reactants and also in order to point out the difference between the compounds herein contemplated and those contemplated in our above-mentioned copending application, Serial No. 666,819, we are herewith repeating much of the subject matter verbatim as it appears in said aforementioned copending application.

As stated, this difference in composition involves the inherent nature of the reactants and resultants, and it is deemed desirable to point out clearly the nature of the product obtained when triricinolein is reacted with polycarboxy acids, and particularly those having 4 to 8 carbon atoms, and particularly dicarboxy acids having 4 to 8 carbon atoms, such as succinic acid, adipic acid, diglycolic acid, and phthalic acid, subject to the previous limitation excluding maleic anhydride, etc. The anhydrides, of course, are the obvious equivalent of the acid and include, among others, phthalic anhydride, etc. Other suitable acids, include oxalic, tricarballylic, tartaric, azelaic, sebacic, etc. Other acids include cis-Δ⁴-tetrahydrophthalic anhydride obtained by the action of butadiene on maleic anhydride, and 3,6-endomethylene-Δ⁴-tetrahydrophthalic anhydride obtained by the action of cyclopentadiene on maleic anhydride. It is to be noted that none of these acids have more than 10 carbon atoms. As stated, it is understood that the acids and anhydrides are considered as equivalents.

A preferred ester product may be obtained by esterification reaction between triricinolein and a dibasic carboxylic acid such as phthalic acid. Ricinoleic acid may be indicated by the following formula:

$$\underset{CH_3(CH_2)_5.\overset{|}{C}H.CH_2CH=CH(CH_2)_7.COOH}{\overset{OH}{|}}$$

which may be conveniently abbreviated for many purposes to HORCOOH. Employing HORCOO as the acyloxy group of ricinoleic acid, triricinolein may be represented by the formula

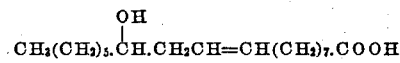

and contains the residue of the polyhydric alcohol glycerol which may be represented as

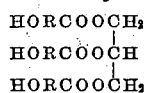

Triricinolein readily esterifies with phthalic acid and if three moles of phthalic anhydride or acid are caused to react with one mole of triricinolein, a fractional acidic ester will be obtained according to the following reaction:

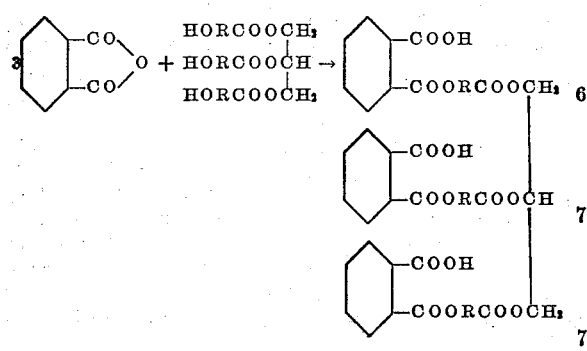

It is not necessary to use three moles of phthalic anhydride per mole of triricinolein and if desired, one may use one or two moles although the preference is to use approximately 2 to 2½ or 3 moles. Likewise, in carrying on the esterification reactions broadly, without limitation to the particular type herein employed as intermediates, it is not essential that a carboxylic group of the dibasic carboxylic acid react with the alcoholiform hydroxyl in the ricinoleyl radical while the ricinoleyl radical remains directly connected with the polyhydric alcohol radical. One might react ricinoleic acid monophthalate, obtained by reaction between ricinoleic acid and phthalic anhydride, mole for mole, with glycerol in the ratio of three moles of the fractional ester for one mole of glycerol. This would yield a mixture of compounds such as the following:

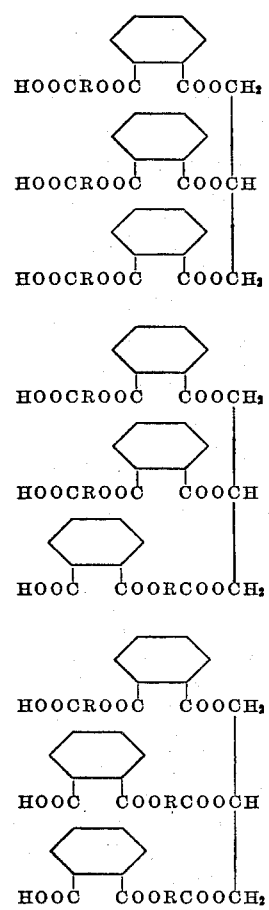

Not only may compounds of the above type be obtained by the procedure previously described, but such compounds may occur to a greater or lesser degree as the result of molecular rearrangement in the production of acidic fractional esters from triricinolein and various polycarboxy acids as previously mentioned, provided one employs temperatures in excess of 210° C. or employs catalysts or both.

In carrying on the esterification reaction, there may develop cross-linkages either through the polyhydric alcohol or the polybasic carboxylic acid due to the polyfunctionality of these materials. For example, in an esterification reaction between triricinolein and phthalic acid, the resulting product may comprise more complex molecules such as the following which illustrate cross-linkage through the polyhydric alcohol residue:

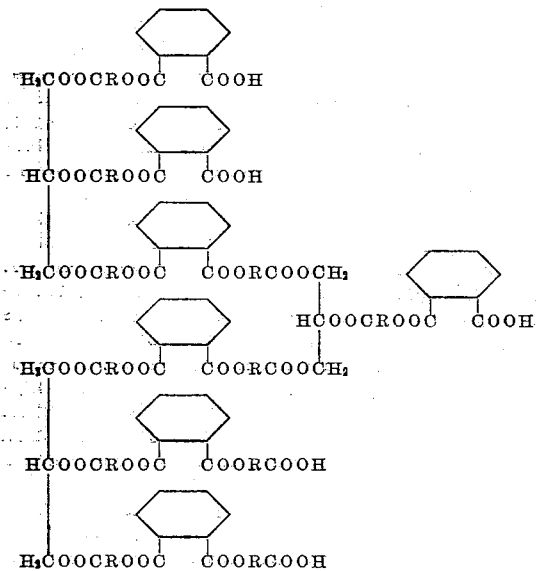

Cross linkage likewise may occur through the polybasic carboxy acid to afford molecular structure such as

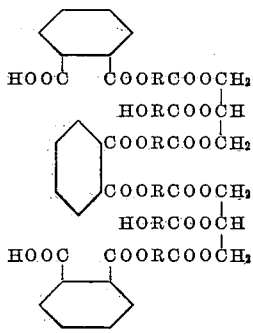

It is apparent that other cross-linkages may occur. Such ester products containing more complex molecules are also suitable. It is also apparent that there may be great variations in the molecular weight of the product. The molecular weight of the ester product as determined by cryoscopic methods or from obvious composition of the ester, usually runs between about 300 and about 4000 and is seldom over 6000. Ester products having a molecular weight over about 10,000, preferably are not employed. During the esterification reaction there may be some polymerization, and polymerized products as well as simple monomers may be used.

Attention is directed to what has been said previously for sake of clarification and that is, that the intermediates herein contemplated, that is the acidic esters derived by reaction between triricinolein and various dicarboxy acids or anhydrides, are limited to those obtained by manufacture under conditions which preclude drastic rearrangements and thus are characterized by the fact that the dicarboxy acid radical is attached directly to the ricinoleyl radical, and not to the glyceryl radical.

TRIRICINOLEIN ACIDIC FRACTIONAL ESTER

*Example 1*

One pound mole of triricinolein (in the form of castor oil which ordinarily contains approximately 85% to 95%, triricinolein) is reacted with 2½ pound moles of phthalic anhydride to produce a mixture of acid phthalates consisting essentially of triricinolein dibasic phthalate and triricinolein tribasic phthalate. The reaction may be caused to occur by heating the mixed materials at a temperature of approximately 120° to 140° C. for approximately 6 to 12 hours. The reaction can be followed roughly by withdrawing a small sample of the partially reacted mass and permitting it to cool on a watch crystal. When the reaction has become completed, no crystals of phthalic anhydride appear. When the sample no longer shows the presence of such crystals on cooling, it can be titrated with a standard volumetric alkaline solution, since the acid which remains is due entirely to carboxylic hydrogen in the fractional ester and not to any unreacted phthalic anhydride. If care is taken not to use too high temperatures which would cause formation of heterocyclic bodies of the character above referred to, one can depend upon the standard alkaline solution to indicate the disappearance of the phthalic anhydride. It is not to be inferred, however, that any cyclic bodies, if formed, would be unsuitable.

The product thus obtained, however, seems to consist largely of triricinolein dibasic phthalate and triricinolein tribasic phthalate. Apparently there is no evidence of rearrangement. This fact is indicated by a molecular weight determination and also based on the acid value which usually runs from a little over 100 to slightly less than 110.

TRIRICINOLEIN ACIDIC FRACTIONAL ESTER

*Example 2*

Sebacic acid is substituted for phthalic anhydride in preceding Example 1, to give the corresponding sebacic acid derivative, that is, triricinolein dibasic sebacate and triricinolein tribasic sebacate.

TRIRICINOLEIN ACIDIC FRACTIONAL ESTER

*Example 3*

Adipic acid or anhydric is substituted for phthalic anhydride in preceding Example 1, to give the corresponding adipic acid derivative, that is, triricinolein dibasic adipate and triricinolein tribasic adipate.

TRIRICINOLEIN ACIDIC FRACTIONAL ESTER

*Example 4*

Succinic acid or anhydride is substituted for phthalic anhydride in preceding example, to give the corresponding succinic acid derivative, that is, triricinolein dibasic succinate and triricinolein tribasic succinate.

TRIRICINOLEIN ACIDIC FRACTIONAL ESTER

*Example 5*

Diglycolic acid is substituted for phthalic anhydride in preceding Example 1, to give the corresponding diglycolic acid derivative, that is, triricinolein dibasic diglycolate and triricinolein tribasic diglycolate.

The products of esterification produced according to Examples 1 to 5 are viscous, yellowish or amber colored, oily or sub-resinous materials, resembling somewhat blown castor oil in consistency, and being water insoluble.

It is to be noted that the triricinolein acidic fractional esters herein contemplated as the preferred reactants, are characterized by the fact that they are preferably obtained by esterification reactions involving the use of more than one mole of the polycarboxy acid per mole of triricinolein. For instance, previous formulas indicate combinations wherein 1½ moles to 3 moles of phthalic anhydride are used per mole of triricinolein. In all instances, regardless of the ratio of polycarboxy reactant to triricinolein, there must be at least one free carboxyl per mole of triricinolein in the finished product. Such requirement is met, of course, by triricinolein monobasic phthalate derived from one mole of triricinolein and one mole of phthalic anhydride. Attention is also directed to the fact that all the fractional esters are prepared in such a manner that the final product is anhydrous. The next step is the obvious one of subjecting such anhydrous ester to the action of the polyglycol as herein specified.

The polyglycols which we employ, contain approximately 8 to 12 oxyethylene groups. Our preference to use the oxyethylated compounds is due largely to the fact that they are commercially available, and particularly so in two desirable forms. The most desirable form is the so-called nonaethylene glycol, which, although consisting largely of nonaethylene glycol, may contain small amounts of heptaethylene and octaethylene glycols, and possibly minor percentages of the higher homologs. Such glycols represent the upper range of distillable glycols; and they may be conveniently referred to as "upper distillable ethylene glycols." There is no particularly good procedure for making a sharper separation on a commercial scale; and it is understood that mixtures of one or more of the glycols may be employed, as well as a single glycol. As pointed out, it is particularly preferred to employ nonaethylene glycol as commercially available, although it is understood that this product contains other homologs, as indicated.

Substantially as desirable as the upper distillate polyethylene glycols, are the lower nondistillable polyethylene glycols. These materials are available in the form of a waxy water-soluble material, and the general range may vary somewhat from deca- to tetradecaethylene glycol. As is well understood, the method of producing such glycols would cause some higher homologs to be formed; and thus, even in this instance, there may be present some oxyethylene glycols within the higher range above indicated. One need not point out that these particular compounds consist of mixtures, and that in some instances, particularly desirable esters are obtained by making mixtures of the liquid nonaethylene glycol with the soft, waxy, lower non-distillable polyethylene glycols. For the sake of convenience, reference in the examples will be to nonaethylene glycol; and calculations will be based on a theoretical molecular weight of 414. Actually, in manufacture, the molecular weight of the glycol employed, whether a higher distillable polyethylene glycol or a lower non-distillable polyethylene glycol, or a mixture of the same, should be determined, and reaction conducted on the basis of such determination, particularly in conjunction with the hydroxyl or acetyl value.

As previously pointed out, mere casual examination might lead one to believe that the resultant obtained by reacting acidic fractional esters, such as triricinolein monophthalate, triricinolein diphthalate, or triricinolein triphthalate with nonaethylene glycol or its equivalent, would be the same as reacting with a corresponding amount of ethylene oxide.

If one examines the formula for ricinoleic acid, it becomes obvious that the polycarboxy acid, such as phthalic acid, becomes attached approximately half way in the carbon atom chain and thus oxyethylation, attacking any residual carboxy group which is part of the polycarboxy acid radical, must of necessity cause the hydrophile polyglycol group to enter or make its effectiveness felt half way in the carbon atom chain as differentiated with the introduction of a hydrophile group at the end of a carbon atom chain. For instance, when a high molal alcohol or a high molal acid is subjected to oxyethylation, obviously such effect is produced terminally and not at a mid-point. In this connection, it is interesting to note that oxyethylation does not, as was one time believed, attack the secondary alcoholic radical of triricinolein when castor oil is subjected to oxyethylation. For this reason, oxyethylation of the fractional esters give a product having a hydrophobe-hydrophile balance which is entirely different from that obtained from a number of apparently kindred products.

Compounds herein contemplated, are obtained by esterifying free carboxyls with a glycol of the kind described. It is understood, however, that this particular specification does not include those types wherein such glycols would be replaced by polyhydric alcohols having a larger number of hydroxyl groups per molecule, i. e., does not include glycerol, diglycerol, triglycerol, etc. Furthermore, the compounds herein contemplated, are derived solely from triricinolein and do not include compounds derived from monoricinolein, diricinolein, or any other type of fractional ester where the number of ricinoleic acid radicals is less than the valency of the polyhydric alcohol (the glyceryl radical) to which they are attached, valency of the radical in such circumstances being measured by the number of available hydroxyl groups, that is, the valency of a glyceryl radical being considered as 3. The reason for this difference is perfectly obvious, in that an available glyceryl hydroxyl radical, as in the case of a derivative of monoricinolein or diricinolein, provides an additional point of reaction for a polybasic acid, such as phthalic anhydride, or if not so reacted upon provides a point of reaction for ethylene oxide. Similarly, if the acidic esters are esterified with glycid or methylglycid instead of ethylene oxide or the like, or glycerol for that matter, then such esters are capable of attack by ethylene oxide so as to provide a branched chain rather than a single chain involving polyglycol radicals. What has been said herein immediately preceding is intended to define the herein contemplated compounds with greater clarity and also to point out the line of demarcation between these particular compounds and those contemplated in our co-pending application, Serial No. 734,207, filed March 12, 1947.

Products of value as demulsifying agents, have been prepared by reacting triricinolein phthalates of the kind described under the heading "Triricinolein acidic fractional esters," with polyhydric alcohols, although not necessarily with polyethylene glycols having a large number of repetitious ether linkages, in such proportion and manner as to render such fractional esters water soluble or water miscible. At first casual examination, it would appear that if one were to react the acid phthalates as exemplified by "Triricinolein acidic fractional ester, Example 1," with polyethylene glycol representing approximately 10 or 12 ethylene oxide units, there should be obtained a product approximately identical with the product obtained by treating triricinolein triphthalate with approximately 30 to 35 moles of ethylene oxide. For instance, this reaction may be indicated in the following manner:

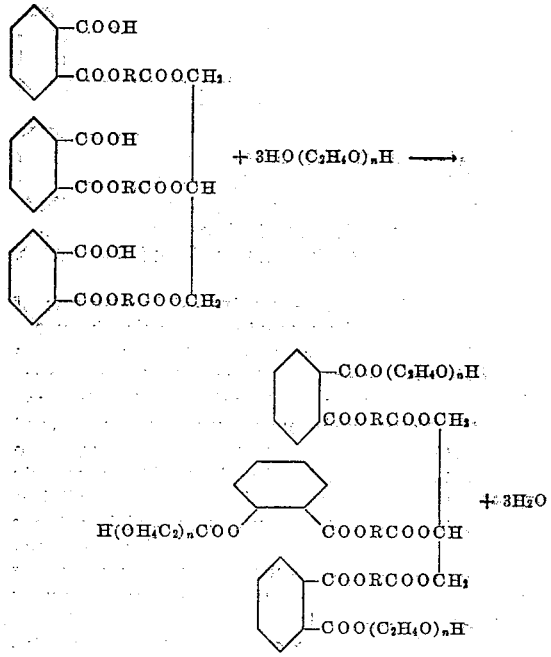

The above reaction emphasizes this very important feature, that if an attempt is made to obtain similar products by reaction with a polyethylene glycol, then water results from the reaction and cognizance must be taken of the fact. Thus, if the reaction is conducted in the presence of water, whereas oxyethylation is conducted under anhydrous conditions, then one must bear in mind that the water formed may become a reactant before elimination. Hence, it is obvious that the course of reaction may be changed.

Another cause for difference in the reaction involving ethylene oxide on the one hand and a polyethylene glycol on the other, is this particular situation: The esters employed are polyfunctional, having, for example, preferably two or more carboxyls per original molecule of triricinolein. The polyethylene glycols are difunctional; thus, when reacted together there is a tendency to form a sub-resinous polyester by reactions involving simultaneously one mole of a polyethylene glycol and two carboxyls which are part of the same molecules, or much more probable, parts of two different molecules. The last mentioned reaction may be indicated by the following manner:

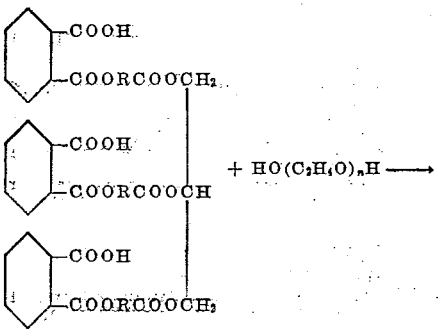

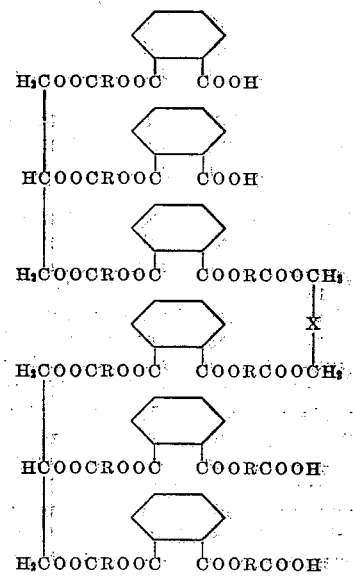

wherein X is HOCH₂-X-CH₂OH representing the original polyethylene glycol.

In light of what is said hereinafter, it is obvious that the above reaction represents only the first step or part of the reactions which yield the ultimate product herein contemplated. The above reaction shows esterification only and not pyrolysis. The reason is obvious by reference to the claims where it is specified that the amount of water evolved during pyrolytic esterification is at least twice that theoretically obtainable from the complete reaction of the free carboxyl radicals present.

In connection with what is said herein in regard to the difference between oxyethylation on the one hand and esterification on the other hand, it must be remembered that oxyethylation takes place readily and rapidly at temperatures considerably under 200° C; and that this particular temperature may be considered the upper limit. Esterification as shown subsequently, invariably involves much higher temperatures, such as 230° C. to 340° C.

In considering what is said herein as to the difference in structure, it may be particularly convenient to refer to a single oxyethylated product derived from "Triricinolein acidic fractional ester, Example 1." For convenience we are going to describe this particular compound which is a suitable basis for comparison, in the same manner as it is described in our co-pending application Serial No. 666,819 filed May 2, 1946.

WATER - SOLUBLE OXYETHYLATED TRIRICINOLEIN FRACTIONAL ESTER 650 pounds of triricinolein acidic fractional ester manufactured as described under the heading Example 1 preceding, is mixed with ½ pound of sodium methylate and then reacted with approximately 161 pounds of ethylene oxide in three batches of 53.7 pounds each. The maximum pressure during the reaction was 120 pounds per square inch gauge pressure. The time of reaction required for each batch was three to five hours. The temperature employed was approximately 130° C. The material was tested for water-solubility after the addition of 161 pounds of ethylene oxide and found to be water insoluble. If the theoretical molecular weight of triricinolein tribasic phthalate is considered as 1360, then the average molecular weight of the raw material employed was taken as 1300. On this basis, the amount of ethylene oxide added at this point, represented a molal ratio of 1 to 7.3 approximately.

Oxyethylation was then continued by the addition of three more portions of approximately 60 pounds each, so that at the end of the sixth batch, the molecular ratio had more than doubled and was approximately 1 to 18.0. The product at this point began to show some distinctly hydrophile character and solubility, but was reacted further with five additional portions of approximately 65 pounds each. Thus the total amount of ethylene oxide added, represented 161 pounds, plus 180 pounds, plus 235 pounds, being a total of 666 pounds, of ethylene oxide added to 650 pounds of the original resin. On a weight-by-weight basis, this represented slightly in excess of 1 to 1, and on a molal basis, it represented approximately 30 to 32 moles of ethylene oxide per mole of monomeric fractional ester. The resultant was a thin, deep amber colored, water soluble product having a clear appearance in solution and good foaming properties.

The product so obtained consists principally of oxyethylated triricinolein dibasic phthalate and oxyethylated triricinolein tribasic phthalate. The composition of these two compounds may be shown in the following manner:

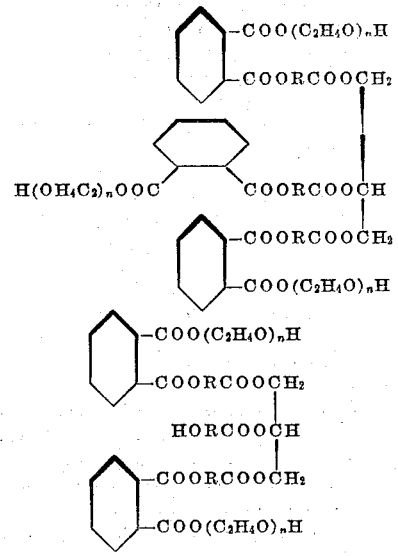

In the above formulae, the value of $n$ varies on the average from 10 to 11 in the case of the tribasic derivative and from 12 or 13 for the dibasic product. The acid value of this product is substantially nil, generally running about 1 to 2 at the most.

An examination of such reactions is best conducted on a laboratory scale. In other words, if one were to start with approximately 650 grams of the mixture described under the heading "Triricinolein fractional ester, Example 1," and having an acid value of approximately 105, and add thereto the equivalent of 2½ moles of a polyethyleneglycol having approximately 10 to 11 structural units, on completion of reaction one would anticipate that there would be a drop in acid value to approximately 0, corresponding to the acid value of the product described under the heading "Water-soluble oxyethylated triricinolein fractional ester," along with the elimination of a stoichiometrical amount of water which would be equivalent to ½ of 2½ moles, or 17½ grams.

Such reaction can be conducted in any one of three ways: (a) Absence of a catalyst; (b) presence of an acid catalyst, or (c) presence of a basic catalyst. Actually, there is little or no justification for using a basic catalyst, for the reason that under such circumstances, one would not expect to obtain a product comparable to that described under the heading "Water-soluble oxyethylated triricinolein fractional ester," but would expect to get a product to which a large degree of glycerol had been replaced by the nonaethylene glycol with subsequent corresponding reaction. In other words, one would expect transesterification, which is sometimes referred to as ester-interchange or alcoholysis. (See Organic Chemistry, Fieser and Fieser, page 182, D. C. Heath and Company, Boston, 1944, and Organic Chemistry, Fuson and Snyder, page 92, J. Wiley & Sons, New York, 1942.)

In conducting these exploratory experiments, it becomes obvious that the two end points do not coincide, namely, the elimination of the expected amount of water and reduction of the acidity to the value of 1 or 2. In each instance, an attempt was made to carry the reaction to the end point indicated in both ways. In the case of the acid catalyst, ½% of p-toluene sulfonic acid was added. In connection with the polyethylene glycol reactant, attention is directed to the article entitled "Technology of the polyethylene glycols, and Carbowax compounds," Chemical and Engineering News, volume 23, No. 3, page 247 (1945). Such article points out, among other things, why the value of $n$ as herein contemplated represents an average value rather than a sole value of one single compound. The results of these experiments are indicated in the following table:

| | L-24142 Experiment A | L-24143 Experiment B | L-24144 Experiment C |
|---|---|---|---|
| Triricinolein Fractional Ester Example 1 | 650 grams<br>Acid V.—105 | 650 grams<br>Acid V.—105 | 650 grams.<br>Acid V.—105. |
| HO(C₂H₄O)ₙH(n=10 or 11) catalyst | 700 grams<br>None | 700 grams<br>½% Toluene Sulfonic acid. | 700 grams.<br>½% Sodium Methylate. |
| Acid value of Mixture | 50.5 | 52.0 | 50.2. |
| Conditions to bring acid value to about 2 | could not get below 14 | could not get below 15.6. | 4 hrs. at 325° C. 7.85 acid v. |
| Time | 3 hours | 4 hours | 4 hours. |
| Max. Temperature | 340° C | 300° C | 325° C. |
| At this point H₂O eliminated | 66.8 | 346 | 54 cc. H₂O and 15 cc. oil. |
| Remarks | plus 53.4 cc. oil | Acid v. rose upon further heating. | Acid value rose upon further heating. |
| Conditions to bring about elimination of 17½ grams of water (theoretical): | | | |
| Time | 40 min | 25 min | 34. |
| Max. Temperature | 280 | 230 | 285. |
| Acid value at this point | 32.8 | 36.6 | 20.4. |
| Remarks | Clear oil; cloudy solution with water. | Clear oil; cloudy solution with water. | Clear oil; cloudy solution with water. |

In comparison with experiments A, B, and C, it has been pointed out previously, as in "Water-soluble oxyethylated triricinolein fractional ester," that such reactant as was used in experiments A, B, and C, can be treated with ethylene oxide under a comparatively low temperature, approximately 120° C., in absence of water, to give a product which is clearly water soluble and which has an average molecular weight approximately equivalent to that of the products obtained in experiments A, B, and C, provided that there was complete chemical combination. The acid value of the oxyethylated derivative was approximately 2.

In examining experiments A, B, and C, it is to be noted that it was impossible to reduce the acid value in any one of the three cases to that obtainable by oxyethylation, to wit, a value of 2. Actually, the values range from approximately 8 to 14. Furthermore, the theoretical amount of water which would be expected to be eliminated in experiments A, B, and C, so as to give a product identical with that previously referred to as Example 1, would be 17½ grams of water. Actually, when 17½ grams of water had been eliminated, in all three cases, the acid value varied from approximately 20 to approximately 33. On the other hand, when the minimum acid value was obtained, even though it did not approach the value of two the amount of water eliminated was a great deal more than theoretical, varying from 54 grams in one instance, to 346 grams in the other. Furthermore, in order to obtain the result indicated, instead of using a temperature of approximately 130° C. or somewhat higher, but in any event under 200° C., the temperature actually varied from 230° C. to 340° C. Attention is directed to a very significant fact and that is that these temperatures employed in experiments A, B, and C, as previously noted, vary from 230° C. to 340° C., and are within the range which produces rearrangement in the manufacture of acidic esters as previously noted. In other words, at such temperature range, even though no catalysts were added, one would expect rearrangements whereby at least to a substantial extent, there would be present compounds in which the dicarboxy acid radical would be directly attached to the glyceryl radical. It is to be noted that this type of material is specifically excluded in the hereto appended claims.

In light of what has been said as to the nature of the reactions taking place, and as to the results obtained in the above experiments, it is perfectly obvious that there is a very marked difference in the nature of the products obtained, depending on whether an acidic fractional ester is subjected to oxyethylation or whether it is subjected to an esterification with a polyglycol in an effort to obtain substantially the same product; although for sake of brevity, reference is made only to products obtained by phthalation, actually other experiments conducted with other polycarboxy acids, particularly succinic acid, adipic acid, diglycolic acid, etc., indicate that results are substantially the same.

In light of the experiments above recited, it is obvious that if one takes a product such as triricinolein monophthalate, triricinolein diphthalate, triricinolein triphthalate, or any analogous fractional ester derived from some other polycarboxy acid such as adipic acid, succinic acid, maleic acid, or adduct acids of succinic or maleic acids, or the like, one can obtain a variety of products which are characterized by the fact that they are dehydrated in the sense that the amount of water eliminated during the reaction is approximately twice theoretical required to eliminate the free carboxyl radicals; and the products are also characterized additionally by the fact that there is still a significant residual acidity. Conditions seem to be approximately the same regardless of whether a catalyst is used or no catalyst is used. The catalyst may be an acid, such as an aromatic sulfonic acid; or it may be an alkaline material such as sodium stearate, sodium carbonate, caustic soda, sodium methylate, etc. In order to illustrate this type of reaction, the following illustrations are included which, for convenience are substantially the large scale equivalents of experiments A, B, and C.

FINAL COMPOSITION OF MATTER

*Example 1*

650 pounds of a material of the kind described under the heading "Triricinolein acidic fractional ester, Example 1," is mixed with approximately 700 pounds of a polyethylene glycol consisting of a mixture of nonaethylene glycol, decaethylene glycol, and undecaethylene glycol, or if desired one may use approximately 10% less of nonaethylene glycol, that is, about 630 pounds of nonaethylene glycol. The products are heated without a catalyst for approximately 3 hours with constant stirring, at about 320° C. to 350° C. At the end of this time, the amount of water eliminated is approximately 65 pounds or slightly more. In addition to this amount of water, which leaves the reaction vessel, there is also somewhere in excess of 50 pounds of oil eliminated. It is to be noted in this respect that the theoretical amount of water, approximately 17½ pounds, is eliminated at a point below the pyrolytic point of triricinolein; that is it is eliminated by the time 275° to 280° C. is reached, particularly if held at this temperature for about 40 minutes. The appearance of oil and the fact that the temperature is above the pyrolytic point of triricinolein, is a strong indication that certain complex changes take place, such as appear in the dehydration of castor oil. The nature of these changes is rather difficult to determine. For convenience, reference is made to "Protective and Decorative Coatings" by Mattiello, volume I, chapter 4, John Wiley & Sons, Inc., New York (1941). However, the fact that dehydration of the triricinolein has taken place (phthalic acid being split off instead of water but the reaction being the same; for example, as when castor oil is first acetylated and then subjected to dehydration by splitting off acetic acid instead of water) is only a partial explanation. The reason for this statement is that where water split off corresponds to the theoretical amount, one still finds the acid value in the neighborhood of 33 compared with original acid value of about 50. The final product is a clear, somewhat viscous oil, giving a cloudy solution in water. The acid value of the final product after being heated to a maximum of 240° C. is approximately 15.

FINAL COMPOSITION OF MATTER

*Example 2*

The preceding example is repeated, but there is added to the reaction mass a catalyst consisting of approximately 7½ pounds of toluene sulfonic acid. In this instance it was found that complete reaction could be obtained at a lower temperature than when no catalyst was employed, for instance, at a maximum of 300° C., provided the reaction was continued somewhat longer, for instance, about 4 to 6 hours instead of 3 hours. Also, in the use of the acid catalyst, the amount of water eliminated was unusually large, approximately five times that eliminated in the previous example, to wit, 345 pounds. Note that in the example previously shown and in the present instance, water refers to the aqueous distillate which may contain other water-soluble materials. The final product was comparable in all respects to the product obtained without use of a catalyst. The fact that the catalyst speeded up the reaction is also indicated by the fact that the theoretical amount of water, 17½ pounds, could be eliminated in 25 minutes at 230° C. At this point, i. e., at the point where the theoretical amount of water was eliminated, the product was more acidic than the comparable product made without a catalyst, for instance, showing an acid value of about 34. It is to be noted that the amount of water eliminated under these circumstances is unusually high and difficult to explain on any rational basis. The destruction of the polyglycol radical is not indicated by the fact that the final product is still as hydrophile as if no catalyst were used or as if an alkaline catalyst were used. The amount of water eliminated simply points to the complexity of the reaction but offers no satisfactory explanation.

FINAL COMPOSITION OF MATTER

*Example 3*

The same procedure was used as previously, except that the catalyst employed was approximately 7½ pounds of sodium methylate. The reaction was heated for approximately 4 hours at 325° C. with the elimination of 55 pounds of water and 15 pounds of a water-insoluble oil. The acid value was reduced to a maximum of about 8, but increased somewhat subsequently. The theoretical amount of water, to wit, 17½ pounds, was eliminated in three-quarter hours of heating at 285° C. The acid value at this point dropped to less than one-half the original value or about 20. The final product was comparable to the materials obtained in the two previous examples.

Due to the fact that the castor oil dehydrates and probably forms, at least in part, conjugated bonds which lead to a Diels-Alder adduct, or in view of the fact that a Clocker type adduct could be formed at such temperature, we have specified that the polycarboxy acids of the type having unsaturated bonds, such as maleic acid or anhydride, and citraconic acid or anhydride, should be avoided. We have found that this type of polycarboxy acids is much less satisfactory and, in fact, very apt to yield rubbery or almost insoluble masses. For this specific reason it is our preference to use polycarboxy acids, such as phthalic acid or anhydride, adipic acid, diglycolic acid, etc., i. e., materials which cannot form olefinic addition products by virtue of the reactive ethylenic structure. This, of course, does not interfere with the use of products obtained by first reacting maleic anhydride, citraconic anhydride or the like, with butadiene, cyclopentadiene, or other suitable reactants capable of addition.

FINAL COMPOSITION OF MATTER

*Example 4*

The same procedure is followed as in Examples 1 to 3, preceding, except that the fractional ester exemplified by "Triricinolein acidic fractional ester, Example 1" is replaced by "Triricinolein acidic fractional ester, Example 3."

FINAL COMPOSITION OF MATTER

*Example 5*

The same procedure is followed as in Examples 1 to 3, preceding, except that the fractional ester exemplified by "Triricinolein acidic Fractional ester, Example 1," is replaced by "Triricinolein acidic fractional ester, Example 4."

In connection with these reactions, it will be noted that as previously pointed out, the reactions are conducted at a temperature above the pyrolytic point of triricinolein (castor oil), which is commonly accepted as being about 265° to 280° C. but, in any event, the reaction is not conducted at a temperature higher than 365° C. and preferably within the range of 300° C. to 340° C. The reaction may be conducted in the presence or absence of a catalyst and preferably is conducted in the presence of an alkaline catalyst. In each case the reaction is conducted so that the amount of water eliminated is at least twice theoretical as would be obtained by reaction of the carboxyl radicals alone and, in any event, the final product still has a significant acid value. The products obtained must be capable of giving at least cloudy solutions or sols with water and thus are characteristically hydrophile. The expression "hydrophile" is used to distinguish from such products which may become sub-resinous or sub-rubbery so as to no longer exhibit hydrophile properties, at least they are not even self-emulsifying in water.

In light of what has been said, it is obvious that the only way these materials can be characterized, is by the method of manufacture. Since the method of manufacture involves the reduction in both the carboxy value and hydroxyl value of the mixture reactants, it is obviously esterification. Since it involves the elimination of water over and above that which is represented by the esterfication reaction per se, one must include pyrolysis. Thus, for convenience, we are referring to this reaction in what appears to be the most suitable terminology—as a pyrolytic esterification reaction. The mixture reactants should be such that the amount of glycol added is at least, stoichiometrically, equivalent to one carboxyl radical of the acidic fractional ester and preferably is, stoichiometrically, equivalent (based on elimination of one hydroxyl only by the poly-glycol) to all the carboxyl radicals present in the acidic fractional ester. It has been previously indicated why polycarboxy acids, particularly dicarboxy acids having alpha-beta unsaturations, are excluded, namely, for the reason that such dienophylic acids may enter into complex reactions giving resinous or rubbery resultants which are unsatisfactory and exhibit little or no hydrophile properties.

Conventional demulsifying agents employed in the treatment of oil field emulsions, are used as such, or after dilution with any suitable solvent, such as water; petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, and sulfur dioxide extract obtained in the refining of petroleum, etc., may be employed as diluents. Similarly, the material or materials employed as the demulsifying agent of our process, may be admixed with one or more of the solvents customarily used in connection with conventional demulsifying agents. Moreover, said material or materials may be used alone, or in admixture with other suitable well-known classes of demulsifying agents.

It is well known that conventional demulsifying agents may be used in a water-soluble form, or in an oil-soluble form, or in a form which exhibits both oil and water solubility. Sometimes they may be used in a form which exhibits relatively limited oil solubility. However, since such reagents are sometimes used in a ratio of 1 to 10,000 or 1 to 20,000 or even 1 to 30,000, or even 1 to 40,000 or 1 to 50,000 in desalting practice, such an apparent insolubility in oil and water is not significant because said reagents undoubtedly have solubility within the concentration employed. This same fact is true in regard to the material or materials employed as the demulsifying agent of our process.

We desire to point out that the superiority of the reagent or demulsifying agent contemplated in our process, is based upon its ability to treat certain emulsions more advantageously and at somewhat lower cost than is possible with other available demulsifiers, or conventional mixtures thereof. It is believed that the particular demulsifying agent or treating agent herein described, will find comparatively limited application so far as the majority of oil field emulsions are concerned, but we have found that such a demulsifying agent has commercial value as it will economically break or resolve oil field emulsions in a number of cases which cannot be treated as easily or at so slow a cost with the demulsifying agents heretofore available.

In practicing our process for resolving petroleum emulsions of the water-in-oil type, a treating or demulsifying agent of the kind above described, is brought into contact with or caused to act upon the emulsion to be treated, in any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidedly feasible when the demulsifier is used in connection with acidification of calcareous oil-bearing strata, especially if suspended in or dissolved in the acid employed for acidification.

A somewhat analogous use of our demulsifying agent is in the removal of a residual mud sheath which remains after drilling a well by the rotary method. See U. S. Patent No. 2,135,909, dated November 8, 1938, to Monson. Sometimes the drilling mud contains added calcium carbonate or the like to render the mud susceptible to reaction with hydrochloric acid or the like, and thus expedite its removal. Our compound is particularly adapted for use in connection with such treatment involving the use of strong mineral acid.

One preferred and more narrow aspect of our invention insofar as it is concerned with demulsification of petroleum emulsions of the water-in-oil type, is concerned with the admixture of the ester as described, with a viscosity reducing solvent such as the various solvents enumerated, particularly aromatic solvents, alcohols, ether alcohols, etc., as previously specified. The word "solvent" is used in this sense to refer to the mixture if more than one solvent is employed, and generally speaking it is our preference to employ the demulsifier in a form representing 40% to 85% demulsifier and 15% to 60% solvent, largely, if not entirely nonaqueous and so selected as to give a solution or mixture particularly adaptable for proportional pumps or other measuring devices. The following examples will illustrate this aspect of our invention.

DEMULSIFIER

*Example 1*

| | Per cent |
|---|---|
| Ester, exemplified by "Final composition of matter, Example 1" | 60 |
| Xylene | 20 |
| Isopropyl alcohol | 20 |

DEMULSIFIER

*Example 2*

| | Per cent |
|---|---|
| Ester, exemplified by "Final composition of matter, Example 2" | 70 |
| Cresylic acid | 20 |
| Normal butyl alcohol | 10 |

DEMULSIFIER

*Example 3*

| | Per cent |
|---|---|
| Ester, exemplified by "Final composition of matter, Example 3" | 70 |
| Aromatic petroleum solvent | 10 |
| Isobutyl alcohol | 10 |
| Acetone | 10 |

DEMULSIFIER

*Example 4*

| | Per cent |
|---|---|
| Ester, exemplified by "Final composition of matter, Example 4" (ester obtained by use of alkaline catalyst) | 65 |
| Methyl alcohol | 15 |
| Dichloroethylether | 20 |

(The above proportions represent percentage by weight.)

In the hereto appended claims the word "water-miscible" is employed to designate a sol or solution which is permanent for either an indefinite period of time or either for such extended period of time as would unquestionably permit its utilization for the herein designated purposes without undue difficulties.

For reasons previously stated, the product herein contemplated, and particularly for use as a demulsifying agent, is conveniently described as a hydrophile pyrolytic esterification product derived by reaction between (A) an acidic triricinolein ester of a dicarboxy acid having not over 10 carbon atoms and characterized by the fact that there is present at least one dicarboxy acid carboxyl radical for each triricinolein radical, and all dicarboxy acid radicals are directly attached to the ricinoleyl radicals; and (B) a polyalkylene glycol having at least 8 and not more than 17 ether linkages and the alkylene radical thereof containing at least two and not more than 6 carbon atoms; said pyrolytic esterification product being further characterized by the fact that it is the resultant of a pyrolytic esterification reaction conducted within the temperature range of 265° C. to 365° C., with the proviso (a) that the amount of water evolved during said pyrolytic esterification is at least twice that theoretically obtainable from the complete reaction of the free carboxyl radicals present and (b) that said resultant of the pyrolytic esterification reaction still has a significant acid value.

In our co-pending application Serial No. 666,819, filed May 2, 1946, we have included a series of comparative tests showing the much greater effectiveness of the compounds therein contemplated on a number of typical emulsions, compared with the compounds herein contemplated. It has been our experience that on an equivalent basis such compounds as contemplated in the aforementioned co-pending application Serial No. 666,819 are usually better and more effective. However, we have also found a sizable number of emulsions wherein the compounds herein contemplated appear to be better than any other compound available. They seem to be made-to-order, so to speak, for such specific emulsions. Also, we have found instances in break inducing in the doctor treatment of sour hydrocarbons, where these particular reagents are more effective than are others available. In other words, even though we recognize that compared with many other types, those herein contemplated may have rather limited utility, yet there are instances where they seem to serve more effectively and more economically than any others with which we are now acquainted.

Having thus described our invention, what we claim as new and desire to secure by Letters Patent, is:

1. A process for breaking petroleum emulsions of the water-in-oil type, characterized by subjecting the emulsion to the action of a demulsifying agent comprising a hydrophile pyrolytic esterification product derived by reaction between (A) an acidic triricinolein ester of a dicarboxy acid having not over 10 carbon atoms and characterized by the fact that there is present at least one dicarboxy acid carboxyl radical for each triricinolein radical, and all dicarboxy acid radicals are directly attached to the ricinoleyl radical, and (B) a polyalkylene glycol having at least 8 and not more than 17 ether linkages and the alkylene radical thereof containing at least 2 and not more than 6 carbon atoms; said pyrolytic esterification product being further characterized by the fact that it is the resultant of a pyrolytic esterification reaction conducted within the temperature range of 265° C. to 365° C., with the proviso that (a) the amount of water evolved during said pyrolytic esterification is at least twice that theoretically obtainable from the complete reaction of the free carboxyl radicals present, and that (b) said resultant of the pyrolytic esterification reaction still has a significant acid value.

2. A process for breaking petroleum emulsions of the water-in-oil type, characterized by subjecting the emulsion to the action of a demulsifying agent comprising a hydrophile pyrolytic esterification product derived by reaction between (A) an acidic triricinolein ester of a dicarboxy acid having not over 10 carbon atoms and characterized by the fact that there is present a plurality of dicarboxy acid carboxyl radicals for each triricinolein radical, and all dicarboxy acid radicals are directly attached to the ricinoleyl radical; and (B) a polyalkylene glycol having at least 8 and not more than 17 ether linkages and the alkylene radical thereof containing at least 2 and not more than 6 carbon atoms; said pyrolytic esterification product being further characterized by the fact that it is the resultant of a pyrolytic esterification reaction conducted within the temperature range of 265° C. to 365° C., with the proviso that (a) the amount of water evolved during said pyrolytic esterification is at least twice that theoretically obtainable from the complete reaction of the free carboxyl radicals present and that (b) said resultant of the pyrolytic esterification reaction still has a significant acid value.

3. The process of claim 2 wherein the polyethylene glycol radical is a nonaethylene glycol radical.

4. The process of claim 2 wherein the polyethylene glycol radical is a nonaethylene glycol radical, and the dicarboxy acid radical is a phthalic acid radical.

5. The process of claim 2 wherein the polyethylene glycol radical is a nonaethylene glycol radical, and the dicarboxy acid radical is an adipic acid radical.

6. The process of claim 2 wherein the polyethylene glycol radical is a nonaethylene glycol radical, and the dicarboxy acid radical is a diglycolic acid radical.

MELVIN DE GROOTE.
BERNHARD KEISER.

REFERENCES CITED

The following references are of record in the file of this patent:

UNITED STATES PATENTS

| Number | Name | Date |
| --- | --- | --- |
| 1,977,146 | Roberts | Oct. 16, 1934 |
| 1,978,227 | Roberts | Oct. 23, 1934 |
| 2,000,717 | Roberts | May 7, 1935 |
| 2,023,995 | De Groote et al. | Dec. 10, 1935 |
| 2,236,516 | Cahn et al. | Apr. 1, 1941 |
| 2,340,355 | Wirtel | Feb. 1, 1944 |
| 2,401,966 | Salathiel | June 11, 1946 |
| 2,423,364 | Blair et al. | July 1, 1947 |